Oct. 3, 1933. O. M. MÜLLER 1,929,285
CHUCK COLLET
Filed April 25, 1929
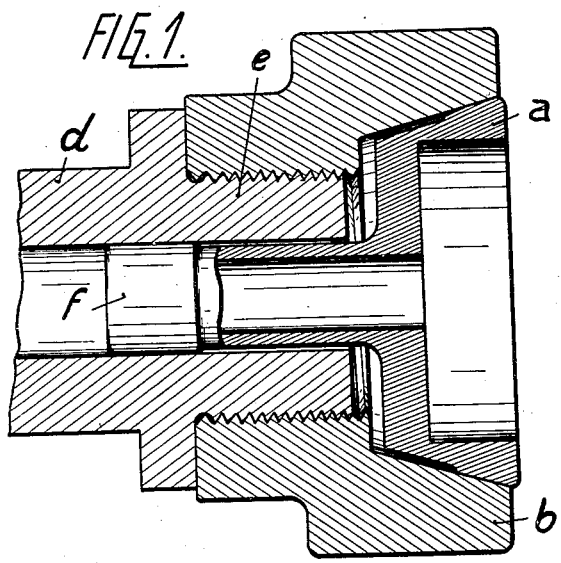
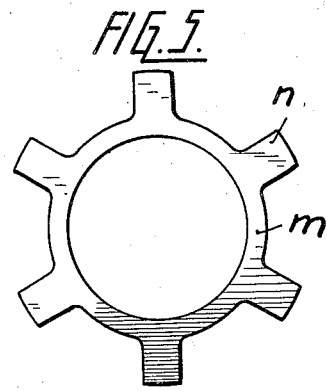
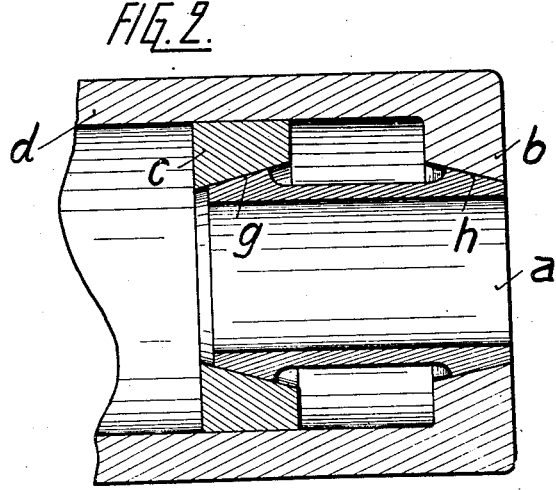
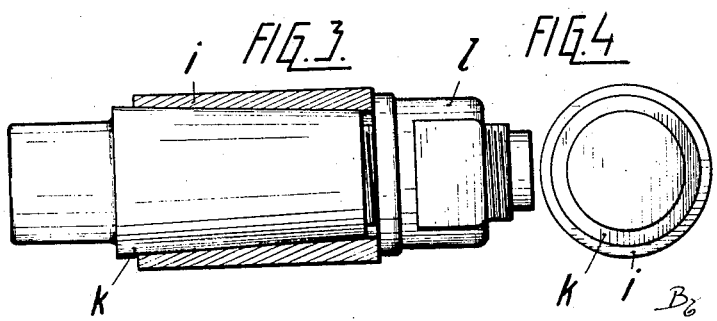
O. M. Muller
INVENTOR
By Marks & Clerk
Attys.

Patented Oct. 3, 1933

1,929,285

UNITED STATES PATENT OFFICE 1,929,285

CHUCK COLLET

Otto Max Müller, Berlin, Germany

Application April 25, 1929, Serial No. 358,121, and in Germany May 2, 1928

2 Claims. (Cl. 279—41)

My invention relates to collets for chucks. It is an object of my invention to eliminate the troubles connected with the hardening of collets and to this end I design the collet with a continuous work-engaging face.

The usual collets are made with longitudinal slots extending radially from the inner to the outer perimeter of the collet. By machining such slots tensions are set up which cause distortion of the tongues intermediate the slots upon hardening. Such irregularities cannot be made up for by grinding so that the tongues extend at various positions with respect to the axis of the collet and the work is not chucked in an exactly coaxial position.

It has been proposed to overcome this tendency to distortion by leaving small webs in the slots which are broken after hardening the collet, but in most cases distortion will occur notwithstanding on account of latent stress.

My invention may be reduced to practice in various ways as will be described in full detail below. Thus, I may provide a collet in the shape of a solid part throughout, or I may recess it on the outside or the inside, or both, but in any case its work-engaging face which may be on the inside or on the outside of the collet, must be continuous. The work to be chucked in the collet may be solid, and inserted in the collet, or it may be hollow, with the collet inserted in the work. Pressure is exerted on the collet from without or within, as the case may be, to apply its work-engaging face to the work. The work-engaging face is continuous, that is, unbroken by slots or gaps.

A member having some similarity to my collet has already been proposed for a thread gage in which the gaging member is applied to the plug to be tested by placing an orifice in the member on the plug, and exerting pressure on the member by which the diameter of the orifice is reduced. This member is undivided like my collet but the face of the member which corresponds to the work-engaging face in my collet is not continuous but interrupted by radial gaps or slots extending from its orifice.

In the accompanying drawing several types of collets embodying my invention are illustrated diagrammatically by way of example.

In the drawing

Fig. 1 is a section of a chuck with a solid collet having a single tapered part and adapted to engage the work on the outside, Fig. 2 is a section of a chuck having a similar collet but with two tapered parts, Fig. 3 is a section of a collet adapted to engage the work on the inside, Fig. 4 is an end elevation of the collet in Fig. 3, viewed from the left, and Fig. 5 is an end elevation of a collet having recesses on the outside.

Referring now to Fig. 1, $d$ is a spindle having a threaded end $e$, $b$ is a collar seated on the threaded end and having a hollow taper at its front, $a$ is a solid, that is, unrecessed and unslotted, collet seated in the taper, and $f$ is a stem on the rear end of the collet which fits an axial bore in the spindle $d$.

Referring to Fig. 2, $t$ is the collet having two tapered ends $g$ and $h$ which is inserted in a hollow taper at the front end of the spindle $d$, and $c$ is a tapered liner in the spindle for holding the tapered rear end $g$ of the collet.

The collets shown are for work which is engaged on the outside, being inserted in the bore or recess of the collet $a$ or $t$. Referring to Figs. 3 and 4, these show a collet for a hollow work, $i$ being the collet, $k$ being a taper on a spindle or mandrel on which the collet is seated, and $l$ being a nut for exerting thrust on the collet so as to force it into the work.

With solid collets as shown deformation under thrust is relied on for chucking the work and this is sufficient for work machined to narrow limits, and the work will be held in an exactly axial position as the tapers being unslotted may be machined very exactly.

If it is desired to provide a collet of comparatively thick section but which notwithstanding this is resilient enough the serrated type shown in Fig. 5 is adopted.

The collet $m$ is serrated at $n$ on the outside, and the continuous inner face of the collet engages the work, as in the collets shown in Figs. 1 and 2 where the work is inserted in the collet, but in a collet like that shown in Figures 3 and 4 where the work is supported on the outer face of the collet the serrations are on the inner face, the outer face being continuous for engaging the work.

It is to be noted that the tapered engaging surface opposite the work engaging surface of each collet body is reduced leaving a relatively thin portion adjacent the tapered portion, the purpose being to increase the resilient action of the collet body $a$ when the same is being applied in a working position.

I claim:

1. A chuck collet including a body having a cylindrical continuous work engaging surface, and having the opposite surface tapered and reduced toward the longitudinal axis to increase the inherent resiliency of the body and facilitate an effective clamping action.

2. A device of the character described comprising in combination, a rotatable supporting member, a collet associated with the supporting member and including a body having a continuous cylindrical work engaging surface and having the opposite surface tapered and reduced towards the longitudinal axis to increase the inherent resiliency of the body and to facilitate an effective clamping action, and an adjusting member associated with the tapered surface for altering the diameter of the work engaging surface, substantially as and for the purposes set forth.

OTTO MAX MÜLLER.